(73.)

S. DONALDSON.

Improvement in Harrows.

No. 122,711.  Patented Jan. 16, 1872.

ATTEST:  
Myron H. Church  
H. F. Eberts

INVENTOR:  
S. Donaldson  
per Atty  
Thos. S. Sprague

122,711

UNITED STATES PATENT OFFICE.

SAMUEL DONALDSON, OF FENTON, MICHIGAN.

IMPROVEMENT IN HARROWS.

Specification forming part of Letters Patent No. 122,711, dated January 16, 1872.

*To whom it may concern:*

Be it known that I, SAMUEL DONALDSON, of Fenton, in the county of Genesee and State of Michigan, have invented a new and useful Improvement in Harrows; and I do declare that the following is a true and accurate description thereof, reference being had to the accompanying drawing and to the letters of reference marked thereon and being a part of this specification, in which—

Figure 1:
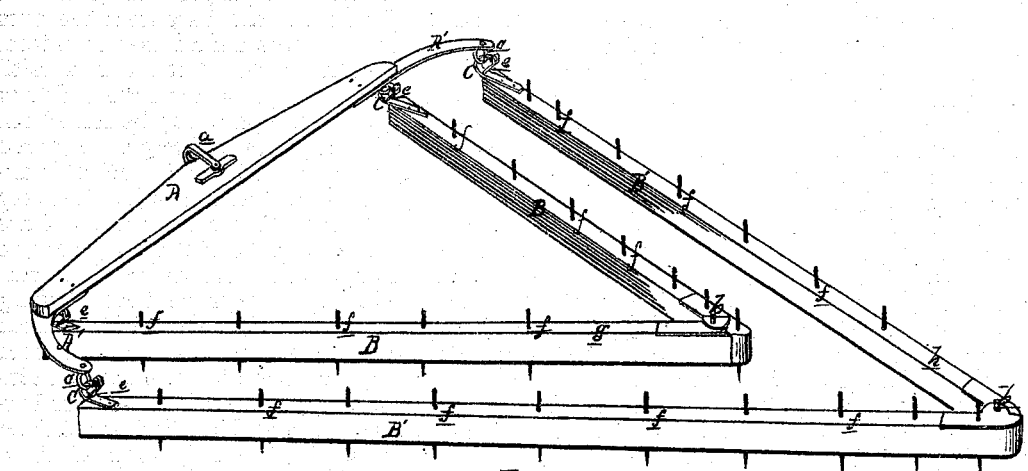
Figure 2:
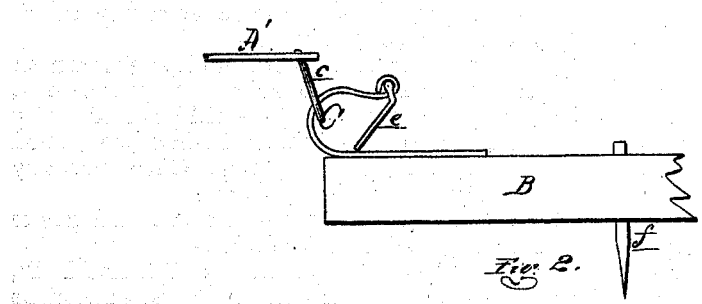

Figure 1 is a perspective view of my harrow; and Fig. 2 is an enlarged side elevation of one end of a drag-bar, showing the draft-hook.

Similar letters of reference indicate corresponding parts in the several figures.

The nature of this invention relates to an improvement in that class of harrows which are made to fold up compactly for transportation and handling; and it consists in the peculiar construction and arrangement of two pairs of bars, armed with teeth, pivoted together at one end, and hooked to a draft-bar at the other, so that when so extended they will form a V-shaped harrow, inclosing another; and the peculiar disposition of the teeth in the bars, so that the débris will be discharged, and thus prevent clogging.

In the drawing, (scale, one inch to the foot in Fig. 1,) A represents the draft-bar, provided with a clevis, $a$, to which the team is attached. A' are extensions of the same, being irons, curved to the rear, one at each end of said draft-bar. B B are two drag-bars, pivoted together by the hinges $b$ at their rear ends in such a way that they may be closed flat together. At the forward end of each bar is placed a hook, C, which engages with a corresponding eye, $c$, on the under side of the extension-irons A' of the draft-bar. To prevent the hooks from detaching accidentally from the eyes the extremity of each hook passes through a slot in one end of a gravity-latch, $e$, and is turned over to form a hinge for said latch. The eye $c$ is made large enough to pass the hook and latch, after which the latter drops to the position shown in Fig. 2, thereby effectually accomplishing the purpose for which it is intended. To detach the bars from the eyes $c$ the operator with one hand raises the latch, and with the other retracts the bar A until the latch enters the eye, which is then drawn off the hook, when the bars may be folded flat together and thrown into a wagon or stored away, occupying but little room. B' B' is another pair of bars, similar to the first in every respect, except that they are larger, and are hooked to the extremities of the draft-bars, so as to inclose the bars B. The teeth of the harrows are shown at $f$. To prevent the clogging of the harrows one tooth is omitted at $g$, near the rear end of one of the bars B, and another at $h$ of the opposite bar B'. The débris accumulating in the apex of the first or inner harrow passes out at $g$, and is discharged from the outer one at $h$. It will be noticed, however, that the omission of teeth at these points does not prevent the harrowing of the soil in their wake, as the path of the vacant spot $g$ is operated upon by an additional number of teeth inserted in the outer bar following it, and vice versa, at $h$, an additional tooth or teeth being placed in the inner harrow in advance of the open space.

In meeting with a stone or other obstruction the inner harrow will raise up to pass over it, and the unharrowed space will be acted on by the outer harrow if the stone has been rolled over from its bed by the first, which is usually the case.

What I claim as my invention, and desire to secure by Letters Patent, is—

The combination of the bars B B and B' B', pivoted to the draft-bar A and its extensions A', so as to have independent vertical motion, and provided with the teeth $f$, arranged so as to leave spaces at $g$ and $h$, all constructed substantially as and for the purposes set forth.

SAMUEL DONALDSON.

Witnesses:
   H. F. EBERTS,
   MYRON H. CHURCH. (73)